US010386150B2

(12) United States Patent
Leonesio et al.

(10) Patent No.: US 10,386,150 B2
(45) Date of Patent: *Aug. 20, 2019

(54) FIREARM SUPPORT SYSTEM

(71) Applicant: LEONARDO S.P.A., Rome (IT)

(72) Inventors: Gian Battista Leonesio, Lonato del Garda (IT); Paoloandrea Castelletti, Brescia (IT); Gianmario Gregorini, La Spezia (IT)

(73) Assignee: LEONARDO S.P.A., Rome (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/577,665

(22) PCT Filed: May 27, 2016

(86) PCT No.: PCT/IB2016/053131

§ 371 (c)(1),
(2) Date: Nov. 28, 2017

(87) PCT Pub. No.: WO2016/189507

PCT Pub. Date: Dec. 1, 2016

(65) Prior Publication Data

US 2018/0164066 A1 Jun. 14, 2018

(30) Foreign Application Priority Data

May 28, 2015 (IT) ........................ 102015000018853

(51) Int. Cl.
*F41A 23/20* (2006.01)
*F41A 27/12* (2006.01)
(Continued)

(52) U.S. Cl.
CPC ................ *F41A 23/20* (2013.01); *B64D 7/06* (2013.01); *F41A 17/10* (2013.01); *F41A 27/12* (2013.01); *F41G 5/14* (2013.01)

(58) Field of Classification Search
CPC .......... F41A 23/20; F41A 27/12; F41A 17/10; F41G 5/14; B64D 7/06
See application file for complete search history.

(56) References Cited

U.S. PATENT DOCUMENTS 1,300,264 A * 4/1919 Hamilton ................ F41A 27/02 89/37.01
1,820,820 A * 8/1931 Muller .................... F41A 27/02 89/41.01
(Continued)

FOREIGN PATENT DOCUMENTS

WO 2013/041956 A1 3/2013

OTHER PUBLICATIONS

International Search Report and Written Opinion from corresponding International Patent Application No. PCT/IB2016/053131, dated Sep. 7, 2016.

(Continued)

*Primary Examiner* — Michelle Clement
(74) *Attorney, Agent, or Firm* — Merchant & Gould P.C.

(57) ABSTRACT

A firearm support system is adapted to be installed in a vehicle, in particular an aircraft. The vehicle includes a compartment to accommodate the crew. The compartment has: a bearing surface, an upper structure rising above the bearing surface, and an opening, through which a firearm shoots. The support system includes: an anchoring portion, for being fixed to the upper structure and located in the compartment; a mobile support, which is coupled to the anchoring portion in a mobile manner, is adapted for receiving the firearm, and allows the firearm to move between an operating position, in which the firearm is ready to shoot through the opening, and a non-operating position, in which the firearm is retracted.

12 Claims, 9 Drawing Sheets

(51) Int. Cl.
*F41A 17/10* (2006.01)
*F41G 5/14* (2006.01)
*B64D 7/06* (2006.01)

(56) References Cited

U.S. PATENT DOCUMENTS

| | | | | | |
|---|---|---|---|---|---|
| 2,021,720 | A * | 11/1935 | French | F21V 21/30 | 192/48.8 |
| 2,088,600 | A * | 8/1937 | Karnes | F41G 5/26 | 116/205 |
| 2,400,385 | A * | 5/1946 | Blaylock | F41A 27/18 | 89/33.4 |
| 2,457,532 | A * | 12/1948 | Cunningham | F41A 27/28 | 318/630 |
| 2,483,385 | A * | 9/1949 | Humphrey | F41A 17/08 | 192/138 |
| 2,692,534 | A * | 10/1954 | Pluess | F41A 17/08 | 200/38 CA |
| 2,790,357 | A * | 4/1957 | Garrett | F41A 25/18 | 89/37.05 |
| 2,791,156 | A * | 5/1957 | Henstrom | F41A 27/06 | 89/41.01 |
| 2,995,986 | A | 8/1961 | Carlberg | | |
| 4,305,325 | A * | 12/1981 | Lange | F41A 27/24 | 89/1.815 |
| 4,336,743 | A * | 6/1982 | Horn | F41A 19/08 | 89/37.03 |
| 4,423,663 | A * | 1/1984 | Politzer | F41A 9/27 | 89/40.02 |
| 4,662,265 | A * | 5/1987 | Becker | F16M 11/126 | 248/179.1 |
| 4,686,888 | A * | 8/1987 | Sanborn | F41A 23/34 | 89/37.13 |
| 4,953,443 | A * | 9/1990 | Meier | F41A 27/08 | 89/41.02 |
| 5,024,138 | A * | 6/1991 | Sanderson | F41A 23/00 | 89/37.19 |
| 5,048,392 | A * | 9/1991 | Ruttgerodt | F41A 27/08 | 89/37.07 |
| 5,056,409 | A * | 10/1991 | Allais | F41A 23/20 | 89/37.01 |
| 5,353,680 | A * | 10/1994 | Tiomkin | F41A 7/02 | 89/28.05 |
| 5,421,239 | A * | 6/1995 | Sanderson | B64D 1/08 | 89/37.16 |
| 6,241,185 | B1 * | 6/2001 | Sanderson | B64D 7/02 | 244/118.1 |
| 6,571,678 | B1 * | 6/2003 | Bar | F41A 27/28 | 89/41.02 |
| 6,718,862 | B1 * | 4/2004 | Sanderson | B64D 7/06 | 89/37.22 |
| 7,765,912 | B1 * | 8/2010 | Serkland | F41A 23/00 | 224/401 |
| 7,958,813 | B1 * | 6/2011 | Serkland | B64D 7/04 | 244/118.1 |
| 8,434,397 | B1 * | 5/2013 | Deckard | B64D 7/06 | 89/37.13 |
| 9,151,573 | B2 * | 10/2015 | Isola | F41A 23/20 | |
| 9,428,273 | B1 * | 8/2016 | Serkland | B64D 7/06 | |
| 9,688,405 | B2 * | 6/2017 | Cantine | B64D 7/00 | |
| 2004/0060428 | A1 * | 4/2004 | Sanderson | B64D 7/06 | 89/37.22 |
| 2008/0034954 | A1 * | 2/2008 | Grober | F41A 23/14 | 89/41.05 |
| 2008/0047421 | A1 | 2/2008 | Carroll, III et al. | | |
| 2008/0264246 | A1 * | 10/2008 | Sembtner | F41A 27/06 | 89/41.02 |
| 2010/0126338 | A1 | 5/2010 | Rastegar et al. | | |
| 2014/0230641 | A1 * | 8/2014 | Isola | F41A 23/20 | 89/37.17 |
| 2018/0164063 | A1 * | 6/2018 | Leonesio | F41A 27/02 | |

OTHER PUBLICATIONS

International Preliminary Report on Patentability from corresponding International Patent Application No. PCT/IB2016/053131, dated Sep. 7, 2016.

* cited by examiner

FIREARM SUPPORT SYSTEM

This application is a National Stage Application of International Patent Application No. PCT/IB2016/053131, filed 27 May 2016, which claims benefit of Serial No. 102015000018853, filed 28 May 2015 in Italy and which applications are incorporated herein by reference. To the extent appropriate, a claim of priority is made to each of the above disclosed applications.

TECHNICAL FIELD

The invention relates to a firearm support system designed to be installed on a vehicle, in particular an aircraft.

TECHNOLOGICAL BACKGROUND

In the defense field, it is known to install a firearm in aircrafts, so that the firearm can open fire on a target through an opening of said aircraft. For example, in helicopters, the firearm, usually a machine gun, is fitted on a support or pedestal, which is fixed to the floor of the aircraft close to the side wall or the side window, or close to the rear ramp.

Assemblies installed in a known manner suffer from some drawbacks.

One drawback lies in the presence of the pedestal fixed to the floor, which hinders or even obstructs the passage of men and equipment going into and out of the aircraft. As a matter of fact, in case the firearm is installed on the support close to the rear ramp, it becomes harder for the crew to move into and out of the aircraft and the same also applies to the passage of large equipment, such as for example military vehicles. Therefore, the firearm and the relative installing assembly are an obstacle in those areas allowing access to the inside of the military vehicle.

A further drawback lies in the fact that a support system fixed to the floor on the inside of the vehicle takes up a lot of space.

SUMMARY OF THE INVENTION

An object of the invention is to provide a firearm support system, which is able to solve this and other drawbacks of the prior art and which, at the same time, can be produced in a simple and economic fashion.

In particular, one of the advantages of this invention lies in the fact that, when the firearm is not shooting against a target, the access to the inside of the vehicle is very easy. In particular, it is easier for men and equipment to move into and out of the vehicle.

A further advantage lies in the constructive simplicity and effectiveness of the support system, which minimizes the space taken up and the obstacles present on the inside of the military vehicle.

According to the present invention, this and other objects are reached by a firearm support system.

The appended claims are an integral part of the technical teachings provided in the following detailed description concerning the invention. In particular, the appended dependent claims define some preferred embodiments of the invention and describe optional technical features thereof.

BRIEF DESCRIPTION OF THE DRAWINGS

Further features and advantages of the invention will be best understood upon perusal of the following detailed description, which is provided by way of example and is not limiting, with reference, in particular, to the accompanying drawings, wherein.

DETAILED DESCRIPTION OF THE INVENTION

Figure 1A:
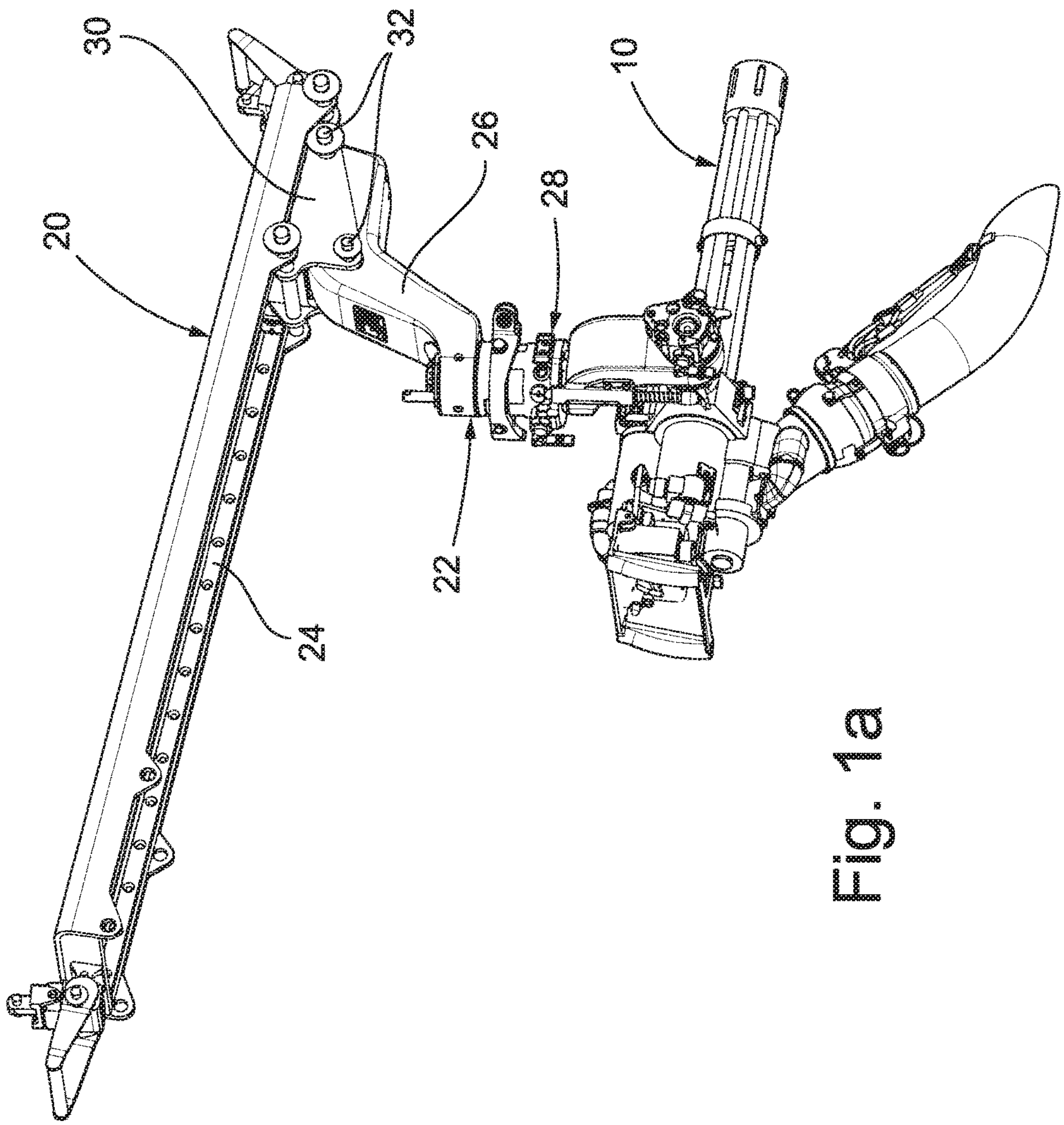
FIGS. 1*a* and 1*b* are perspective views of a first variant according to the invention, in two different operating positions.

The vehicle on which the support system can be installed comprises a compartment to accommodate the crew, wherein the compartment has:

a bearing surface 4, an upper structure 6 rising above the bearing surface 4, and an opening 8, through which a firearm 10 is going to shoot.

The support system comprises:

an anchoring portion 20, for being fixed, preferably in a removable manner, to upper structure 6 and is located in the compartment, a mobile support 22, or mobile support structure, which is coupled to anchoring portion 20 in a mobile manner, is adapted for receiving firearm 10, and is able to allow firearm 10 to move between an operating position, in which firearm 10 is ready to shoot through opening 8, and a non-operating position, in which firearm 10 is retracted. When firearm 10 is retracted, the space taken up inside the compartment is minimized.

Firearm 10 can be, for example, a machine gun, an electric machine gun, a Gatling machine gun, a gas-operated reloading machine gun or other types of known firearms.

With reference to the preferred variants shown in the accompanying drawings, the vehicle can be an aircraft, such as for example a helicopter or a fixed-wing airplane. Alternatively, the support system can be applied to further vehicles, such as for example a ship or a ground vehicle (for example a vehicle with tracks or a vehicle on wheels). In case of an aircraft, the upper structure of the compartment can be the fuselage.

Bearing surface 4 substantially is the floor of the vehicle, on which the crew can usually walk and which, if necessary, can also be used as a loading surface. Upper structure 6 comprises the side walls and the ceiling of the compartment; upper structure 6 can be the fuselage of an aircraft. Therefore, according to the invention, the support system for the firearm substantially hangs—or is suspended—from said upper structure 6. In this way, the bearing surface substantially remains free, thus minimizing the space occupied in the compartment of the vehicle.

According to an embodiment, anchoring portion 20 can be fixed to at least one rib or spar belonging to upper structure 6 of the compartment, in particular to the fuselage of the aircraft. Furthermore, anchoring portion 20 can be associated with further structural elements belonging to upper structure 6 of the vehicle, such as beams, panels, etc.

Figure 1B:
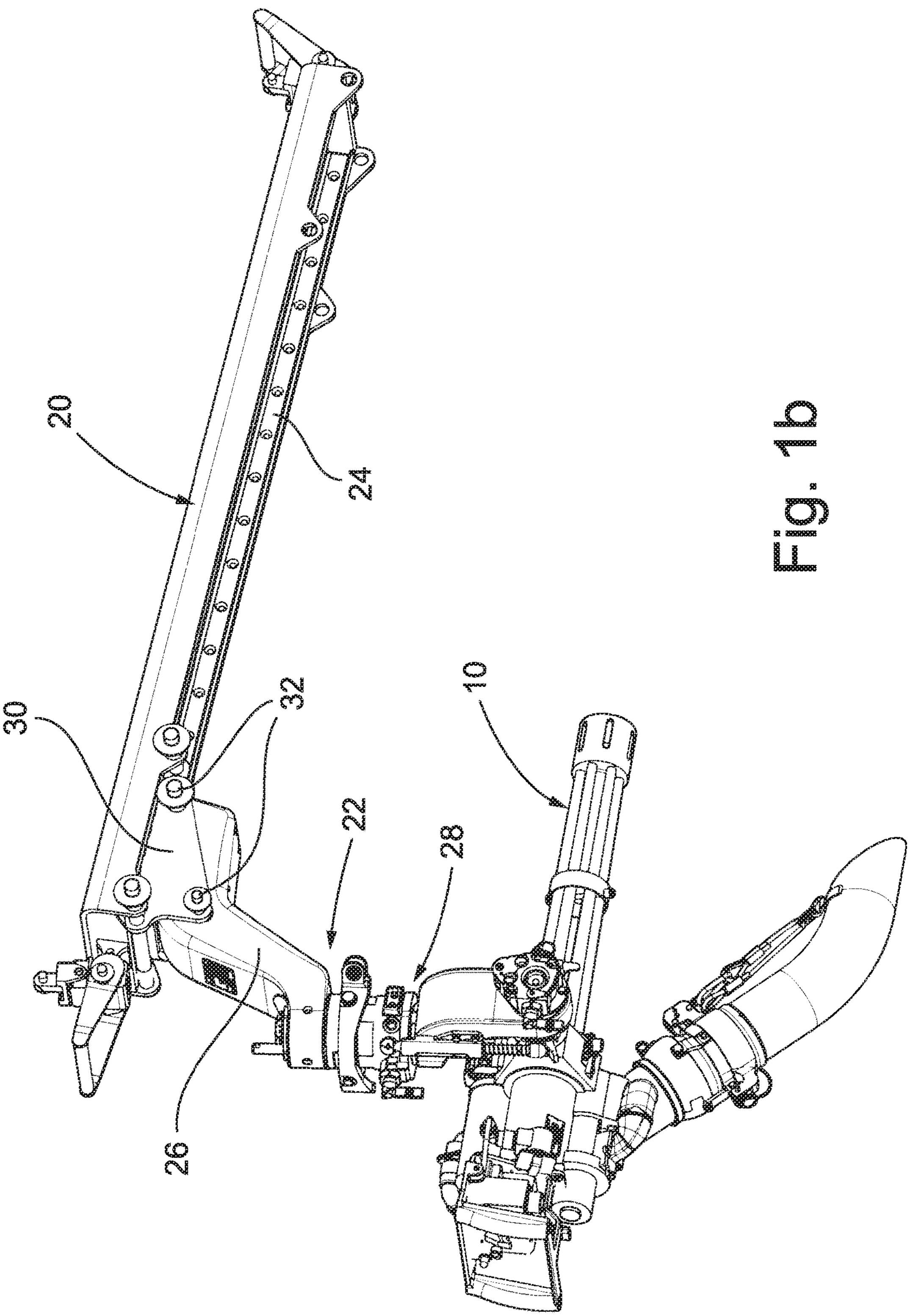
Figure 2:
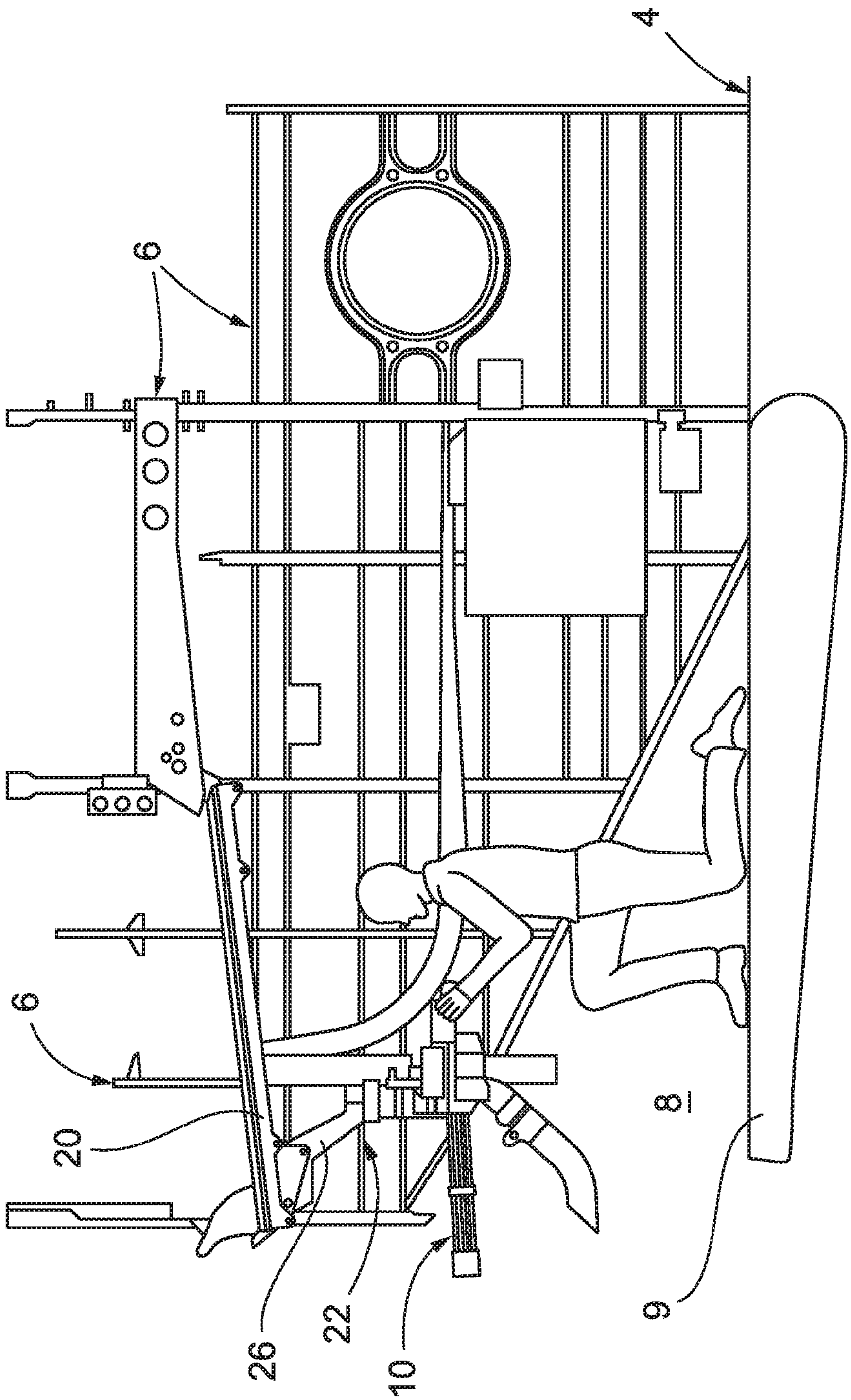
FIG. 2 is a schematic side view of the variant shown in FIGS. 1*a* and 1*b*.

With reference to the variant shown in FIGS. 1*a*, 1*b*, and 2, mobile support 22 can slide on anchoring portion 20, especially projecting under it. Anchoring portion 20 is an oblong element. In particular, anchoring portion 20 is designed to be fixed to a plurality of ribs or spars (indicated, by way of example, with 6). Anchoring portion 20 includes a system of guides 24, to enable the sliding movement of mobile support 22. By mere way of example, the variant of the support system shown herein can advantageously be installed in a helicopter, maybe a Boeing® CH-47 helicopter. As it is known, CH-47 is a tandem rotor helicopter having a rear loading ramp to load men and equipment, such as ground vehicles. Rear ramp 9 is used to open and close opening 8 through which firearm 10 is going to shoot. This support system can be associated with other types of vehicles or aircrafts having a rear loading ramp.

According to a particular embodiment, in the operating position, firearm 10 at least partly projects from opening 8 and, in the non-operating position, said opening can be completely closed.

Preferably, mobile support 22 comprises an arm 26, which is connected, at a first end of its, to anchoring portion 20 in a mobile manner, and is connected, at a second end of its, to a firearm support 28, which is able to allow firearm 10 to rotate relative to arm 26.

With reference to FIGS. 1*a* and 1*b*, arm 26 can slide relative to anchoring portion 20. In particular, the support system comprises a sliding bracket 30, which can slide on the system of guides 24 and is coupled to arm 26. Arm 26 is interposed between a pair of sliding brackets 30. For example, arm 26 is coupled between the pair of sliding brackets 30 by means of pins 32, in a removable manner. It is clearly possible to also use other known fixing means to enable the coupling between arm 26 and sliding brackets 30.

Figure 3A:
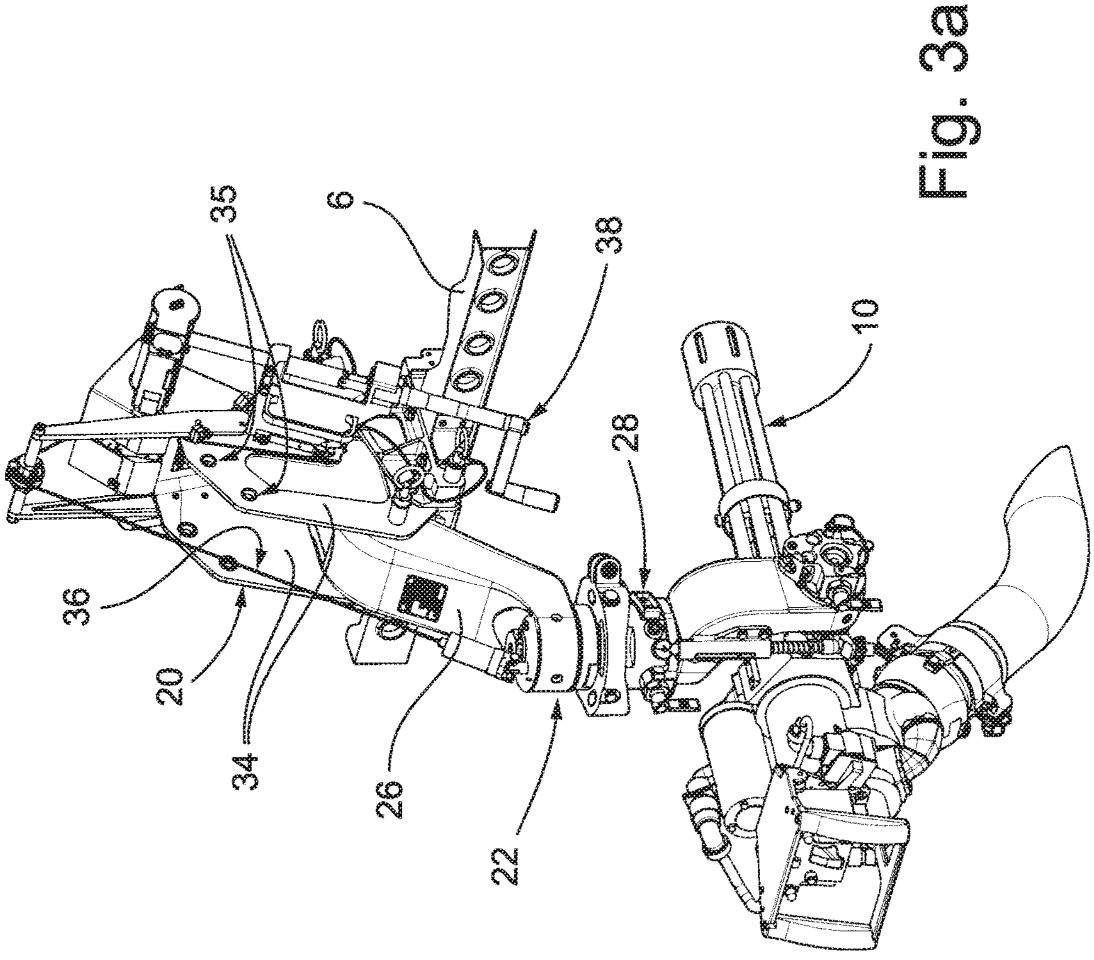
FIGS. 3*a* and 3*b* are perspective views of a second variant according to the invention, in two different operating positions.
Figure 3B:
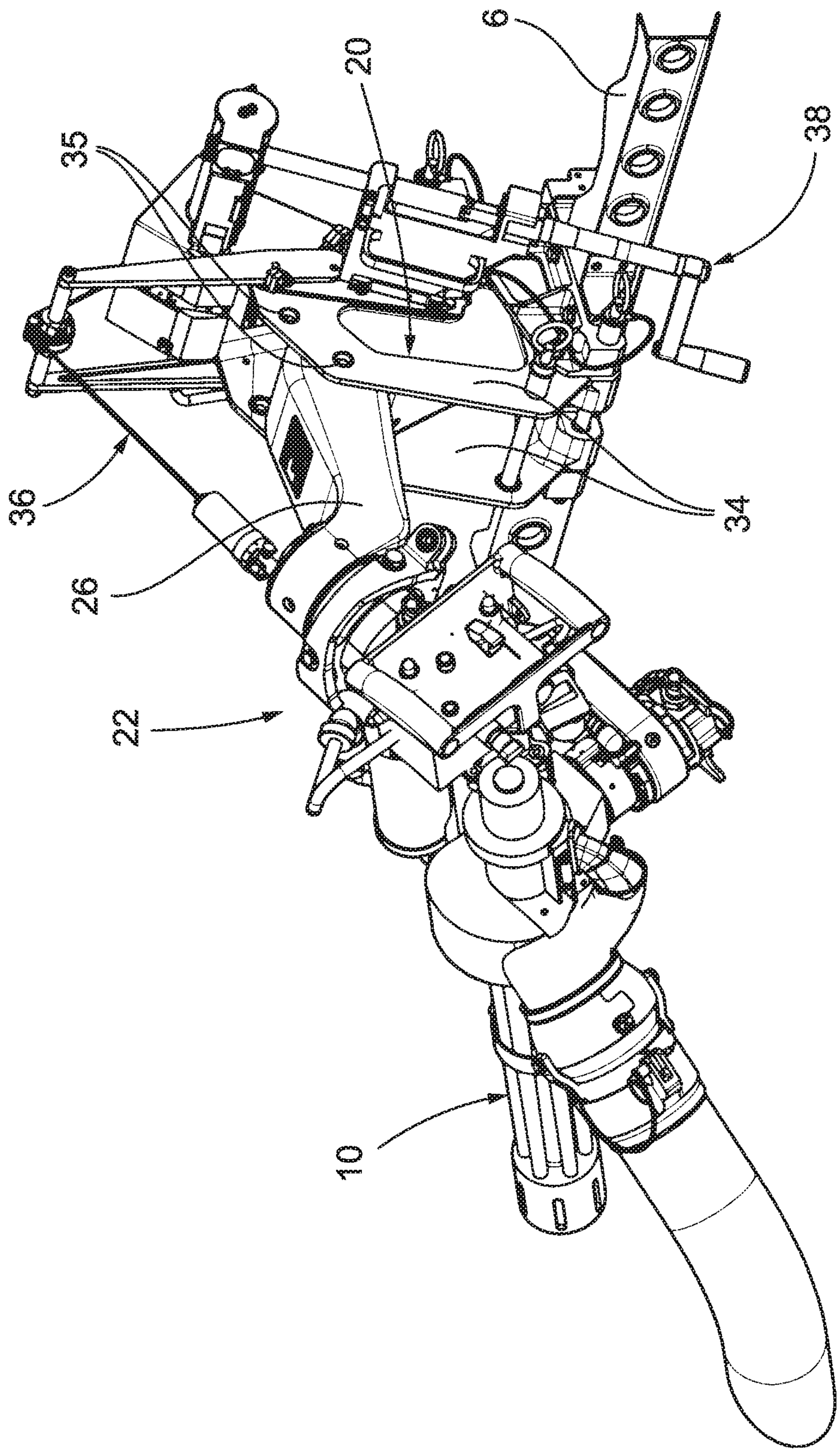

FIGS. 1*a* and 3*a* show the support system in the operating position; FIGS. 1*b* and 3*b* show the support system in the non-operating position. With reference to the variant shown in FIGS. 1*a* and 1*b*, in the non-operating position, mobile support 22 is farther away from opening 8 through which firearm 10 is going to shoot. In this position, it is possible to close opening 8, for example by closing rear ramp 9.

With reference to the variant shown in FIGS. 3*a* and 3*b*, mobile support 22 can rotate relative to anchoring portion 20. Anchoring portion 20 is fixed to upper structure 6; for example, anchoring portion 20 is coupled, preferably in a removable manner, to at least one rib or spar. Advantageously, anchoring portion 20 includes a pair of brackets 34 coupled to upper structure 6, in particular to a rib or spar. Mobile support 22 comprises arm 26, which is connected, at a first end of its, to anchoring portion 20 in a mobile manner, and is connected, at a second end of its, to a firearm support 28, which is able to allow firearm 10 to rotate relative to arm 26. Preferably, arm 26 can rotate relative to anchoring portion 20. In particular, arm 26 is hinged to anchoring portion 20, so as to rotate around a rotation axis; advantageously, this rotation axis is substantially horizontal.

Conveniently, though not necessarily, there is provided an actuator means (or "actuator") to control the movement of mobile support 22 relative to anchoring portion 20. For example, the actuator means controls the movement of arm 26 relative to anchoring portion 20. Advantageously, the actuator means is also adapted to keep said mobile support 22, and in particular arm 26, in a predetermined position relative to anchoring portion 20.

With reference to the variant shown in FIGS. 3*a* and 3*b*, the actuator means includes a cord or rope 36, which is connected to arm 26 so as to allow it to rotate around the rotation axis. Similarly, a chain can be used. Rope 36 is operated by an operating mechanism. In the example shown herein, the operating mechanism can be manually operated by a user. In particular, the operating mechanism includes a turning handle 38, for being held by a user and, by turning, winds and—respectively—unwinds rope 36, thus controlling the rotation of arm 26. According to a different variant, rope 26 is operated by an automatic operating mechanism.

With reference to the variant shown in FIGS. 1*a*, 1*b*, and 2, the actuator means advantageously is a linear actuator to control the sliding movement of mobile support 22 relative to anchoring portion 20.

Generally speaking, the actuator means can be manually-operated or automatic. For example, in case of automatic operation, it is possible to use a motor means, conveniently an electric motor, which is controlled by a control unit. It is possible to provide a known interface, through which the user gives orders to the control unit so as to operate the actuator means and move mobile support 22 relative to anchoring portion 20.

FIG. 3*a* shows the support system in the operating position; FIG. 3*b* shows the support system in the non-operating position. In the non-operating position, mobile support 22 and firearm 10 do not interfere with opening 8 through which firearm 10 is going to shoot, and opening 8 can be closed. For example, the opening can be a side opening made on the side of an aircraft, such as a helicopter.

Advantageously, with reference to the variants including arm 26, said arm 26 is made of carbon fiber or titanium. In this way, the weight of the support system can be minimized, in particular reducing the mechanical forces acting upon the bearing structure of upper structure 6, including, for example, the ribs and spars.

Optionally, a first locking system allows mobile support 22 to be locked, in a releasable manner, relative to anchoring portion 20 in a mutual position. Preferably, the locking system allows mobile support 22 to be locked, in a releasable manner, relative to anchoring portion 20 in a plurality of mutual positions. In particular, the first locking system allows arm 26 to be locked, in a releasable manner, relative to anchoring portion 20 in at least one mutual position. With reference to the first variant shown herein, the mutual position corresponds to a linear position assumed by arm 26 along the oblong element of anchoring portion 20, in the direction of the sliding line of arm 26. With reference to the second variant shown herein, the mutual position corresponds to an angular mutual position between arm 26 and anchoring portion 20, with reference to a rotation axis around which arm 26 can be moved relative to anchoring portion 20. For example, a first mutual position is associated with the operating position and a second mutual position is associated with the non-operating position.

The first locking system can be manually activated/deactivated by a user. Alternatively, the locking system can be activated/deactivated by means of a control unit; for example, the user can act upon an interface to generate a locking/release signal to activate/deactivate the mutual locking between the respective components. For example, this first locking system can be used when there are no actuator means to move mobile support 22 relative to anchoring portion 20. With particular reference to FIGS. 3*a* and 3*b*, arm 26 can be locked in the operating condition and in the non-operating condition by means of a pin passing through holes 35 made in at least one bracket 34 and arm 26.

The support system can be advantageously installed in an existing vehicle in a quick and effective manner.

Advantageously, firearm 10 can move relative to arm 26. In particular, firearm support 28, in a known manner, allows firearm 10 to rotate in elevation and in traverse, so as to allow the user to aim at a target and start shooting.

Firearm support 28 comprises an innovative mechanism, foe defining the limit profile delimiting the possible trajectories of the projectiles coming out of firearm 10. This profile is also known as "field of aim" or "firing profile".

As we will explain more in detail below, the aforesaid mechanism operates—in an advantageous manner—by means of a principle substantially of the "cam" type.

Firearm support 28 for firearm 10 comprises:

a body 104, which is provided with at least one profile 106 on its surface;

a feeler pin 100, for striking against profile 106 and for being coupled to firearm 10 so as to follow the movement of said firearm 10;

a support element 108, rotatable around a first axis z-z (traverse axis) relative to body 104, support element 108 being also for being coupled to firearm 10, thus allowing a mutual rotation between said firearm 10 and said support element 108 around a second axis x-x (elevation axis).

Conveniently, when using the system, the first axis z-z is substantially vertical, in particular when firearm 10 is in the operating position.

Figure 4A:
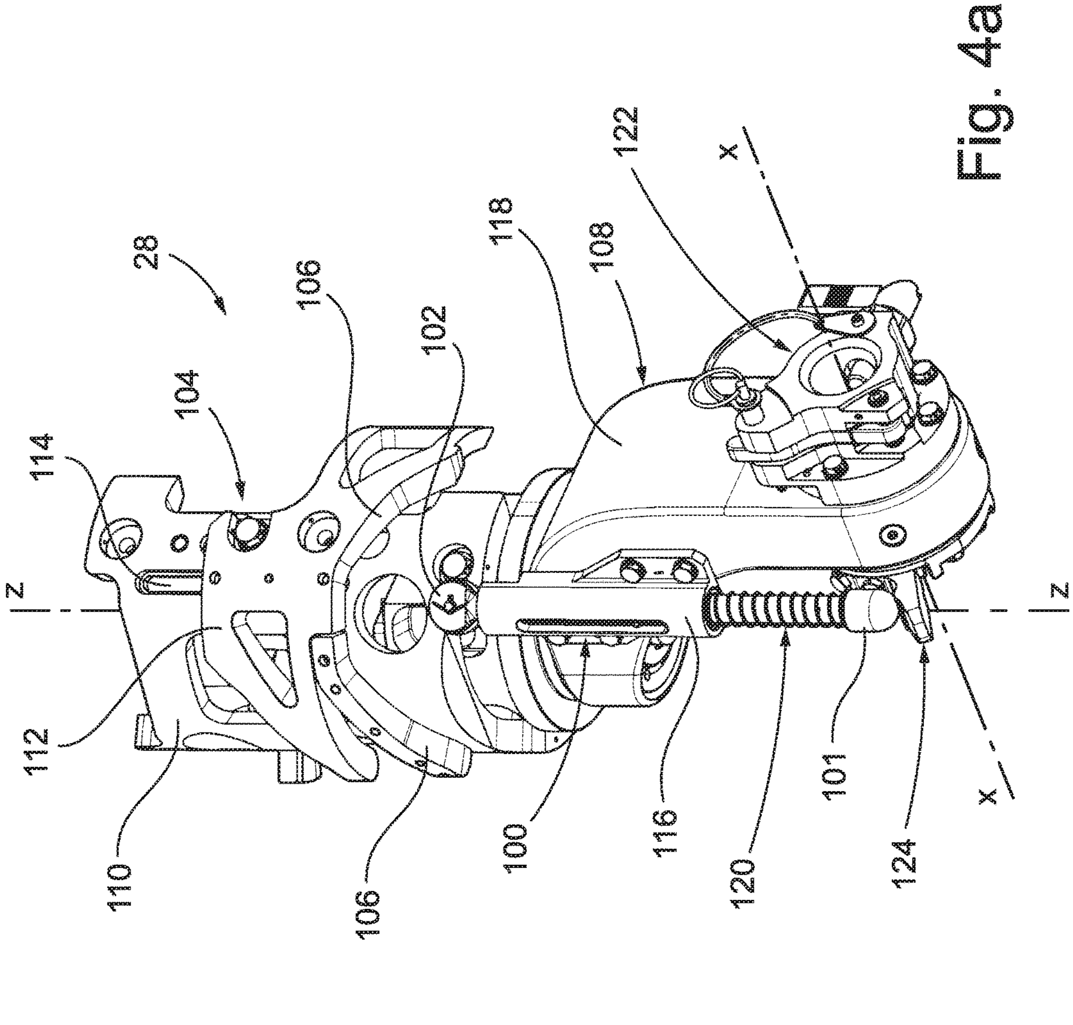
FIGS. 4*a* and 4*b* are perspective views of a detail of the invention, in two different operating positions.

Feeler pin 100 includes a first end 101, which can be coupled to firearm 10, and a second end 102, for striking against profile 106. In FIG. 4*a* the second end 102 is spaced apart from profile 106, whereas in FIG. 4*b* the second end 102 strikes against profile 106.

In the embodiment shown, feeler pin 100 is mobile in a guided manner relative to support element 108 and is preferably shaped like a rod having, on opposite sides, the first end 101 and the second end 102.

Preferably, the second end 102 comprises a rolling element, such as a roller, for sliding along profile 106, thus guiding the movement of firearm 10.

The cooperation between profile 106 and feeler pin 100 delimits the angular width allowed to firearm 10 around the second axis x-x (elevation axis), depending on the angular position of support element 108 relative to body 104 with reference to the first axis z-z (traverse axis). By determining the shape of profile 106 it is possible to configure and select the most appropriate conformation of the field of aim within which firearm 10 can shoot. For example, it is possible to configure a field of aim that exploits as much as possible the space allowed by the space of vehicle where firearm 10 is installed, though without the risk of opening fire on parts of the vehicle. On the contrary, according to the prior art, the field of aim is substantially rectangular or square, as, in known firearm supports, the angular range in elevation/depression and the traverse angular range (or azimuthal angular range) are independent of one another.

For example, it is possible to choose a field of aim having a profile shaped according to the needs, for example even with a polygonal shape with more than four sides, and the polygon can be regular or irregular. Furthermore, the field of aim can comprise curved segments and, if necessary, curved segments as well as straight segments. Advantageously, the field of aim is consistent with opening 8 through which firearm 10 can shoot. As a matter of fact, opening 8 usually does not have a perfectly rectangular shape, but, instead, it can have a complex shape; thanks to innovative firearm support 28, it is possible to enlarge the area of the field of aim as much as possible, though operating in total safety, namely without hitting, in an undesired manner, parts of the vehicle. Therefore, profile 106 can comprise curved and/or straight portions. In the example shown in FIGS. 4*a* and 4*b*, profile 106 has a shape similar to the one of an "upside-down U".

Figure 4B:
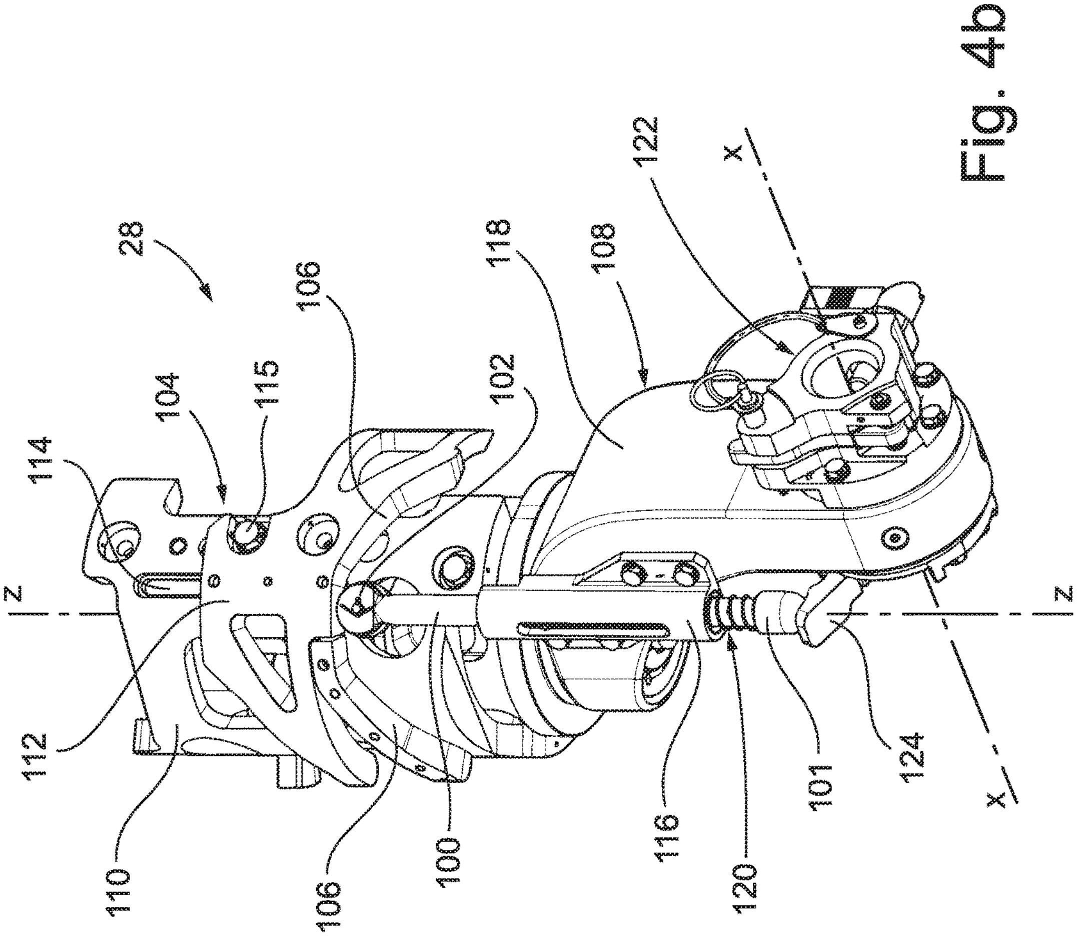

By mere way of example and with reference to FIGS. 4*a* and 4*b*, when the firearm is its operating position, the first axis z-z defines the azimuthal or traverse angle and the second axis x-x defines the elevation/depression angle of the firearm.

The first axis z-z lies on a plane that is substantially perpendicular to the second axis x-x. The first axis z-z and the second axis x-x can be mutually incident or skew.

By way of example, body 104 has a shape that is substantially suited to laterally overlap a stationary upright (if necessary carried by arm 26 and not numbered in the drawings) around which support element 108 can rotate. In particular, body 104 has the shape of a longitudinally cut sleeve, which can be laterally applied to the aforesaid fixed upright (if necessary, in a removable manner, as described more in detail below).

Preferably, body 104 comprises a fixed portion 110 (for example a shaped overhang laterally projecting outwards from body 104) and a mobile portion 112 (for example a shaped overhang laterally projecting outwards from body 104), which can be moved to a plurality of mutual positions relative to fixed portion 110, so as to change the configuration of profile 106. In particular, fixed portion 110 and mobile portion 112 define profile 106 with which feeler pin 100 can cooperate, which is different depending on whether said portions 110, 112 are aligned and/or adjacent or are in distant and/or staggered positions.

By varying profile 106 you can change the field of aim. This aspect is advantageous because it allows the user to change the field of aim in a simple and quick manner, for example based on the type of vehicle and on the limit trajectories that the projectiles of firearm 10 can cover without damaging parts of the vehicle on which firearm support 28 is mounted. Sometimes it is also possible that, in the same vehicle, the field of aim needs to be changed for different reasons; for example, in some helicopters, an external fuel tank can be mounted on the aircraft: in this case, the field of aim could dangerously intercept the tank, thus putting at risk to the safety of the crew, hence the field of aim needs to be changed. Or, for example, when the blades of an helicopter rotate at a low speed or are still, the ends of these blades can bend downwards due to their own weight and, therefore, the trajectory of the projectiles coming out of firearm 10 could dangerously hit the blades; hence, the field of aim needs to be changed limiting the maximum elevation of firearm 10. In this case, the user releases mobile portion 112 from its current position relative to the fixed portion 110, moves mobile portion 112 towards a further mutual position and fixes it: by so doing profile 106 changes and, as a consequence, the field of aim changes as well.

Conveniently, mobile portion 112 can slide on fixed portion 110. For example, respective guides 114 are provided on mobile portion 112 or on fixed portion 110. Furthermore, there are conveniently provided known fixing means (for example screws 115, snapping means, quick-release means, bayonet systems, etc.) to fix, in a removable manner, mobile portion 112 to fixed portion 110 in a mutual position among the plurality of mutual positions that these portions 110, 112 can assume. Preferably, mobile portion 112 can be fixed between two end position of guide 114, corresponding to a maximum field of aim and to a minimum field of aim, respectively.

With reference to the variant shown herein, feeler pin 100 is constrained to support element 108 in a sliding manner. In particular, feeler pin 100 is adapted for sliding substantially parallel to the first axis z-z. Conveniently, a primary guide 116 is coupled to support element 108 and enables the sliding movement of feeler pin 100. Optionally, an elastic means, such as a spring 120, is interposed between feeler pin 100 and primary guide 116 so as to push feeler pin 100 towards a relative position with respect to primary guide 116 and, therefore, with respect to support element 108.

Preferably, support element 108 comprises a lateral bracket 118, or a lateral single-arm, for being coupled to a side of firearm 10. Alternatively, support element 108 comprises a pair of arms, between which firearm 10 can be mounted.

Support element 108 (in particular the distal portion of lateral bracket 118) comprises a coupling system 122, for being coupled to firearm 10 in a releasable manner. Coupling system 122 comprises a mobile striker 124, which is configured to follow, in a constrained manner, the rotation of firearm 10 around the second axis x-x and to control the movement of feeler pin 100. In particular, mobile striker 124 is a rotary lever, which strikes against the first end 101 of feeler pin 100. Optionally, coupling system 122 is coupled to firearm 10 by means of a known pin system.

In the preferred embodiment shown herein, body 104 has a curved shape (with reference to the first axis z-z), in particular body 104 has a semi-cylindrical shape. Preferably, profile 106 is a protuberance on the outer surface of body 104.

Figure 5A:
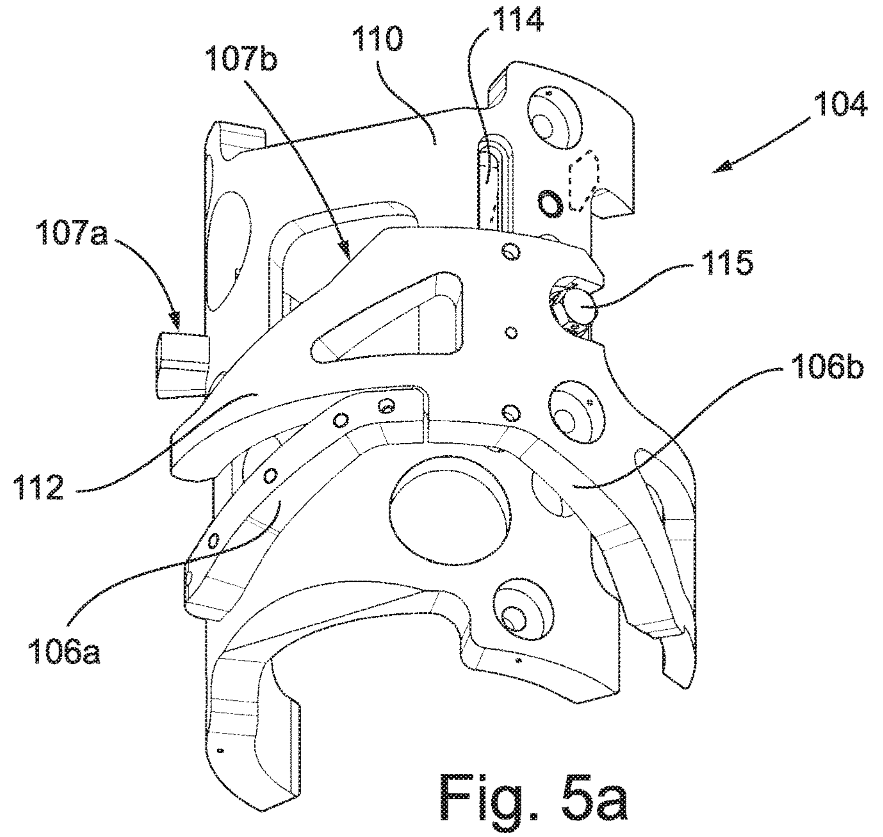
FIGS. 5*a*, 5*b*, 5*c*, 5*d* are perspective views of a detail of the invention, in different operating positions.
Figure 5B:
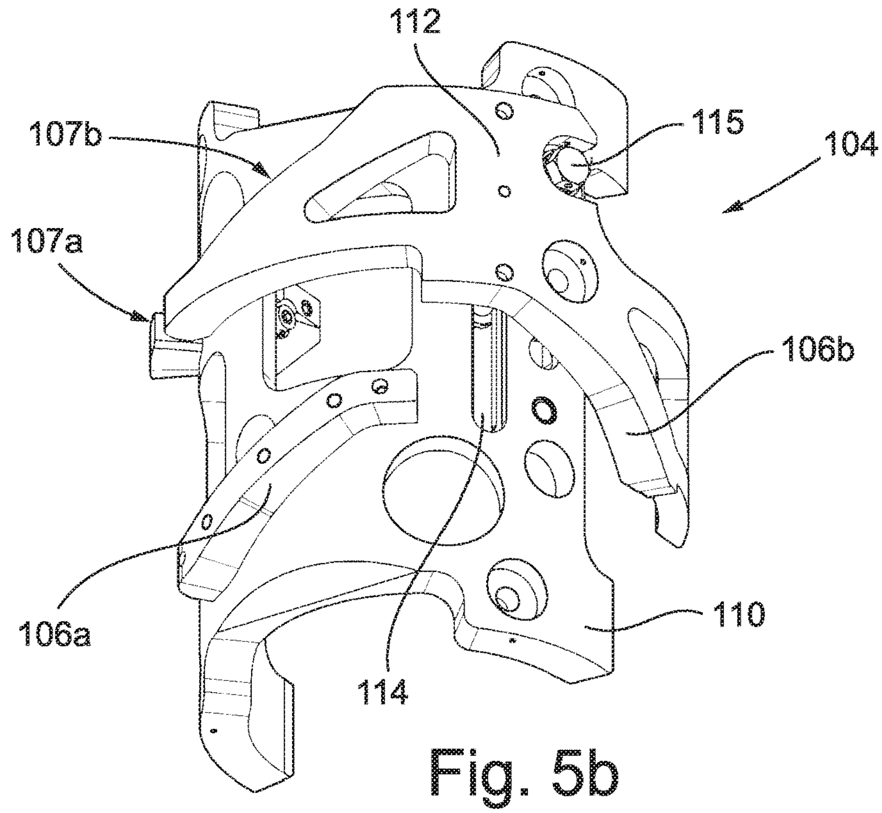

FIGS. 5*a* and 5*b* show body 104, in which the mobile portion 112 assumes two different positions relative to fixed portion 110. In the convenient variant shown herein, fixed portion 110 comprises a first profile 106*a* and mobile portion 112 comprises a second profile 106*b*; said first profile 106*a* and second profile 106*b* forming the profile against which feeler pin 100 is going to strike. In FIG. 5*a*, the first profile 106*a* and the second profile 106*b* are aligned with one another and form a continuous profile, namely substantially without corners or gaps; on the other hand, in FIG. 5*b*, the first profile 106*a* and the second profile 106*b* are not aligned and, therefore, form a profile with corners.

Figure 5C:
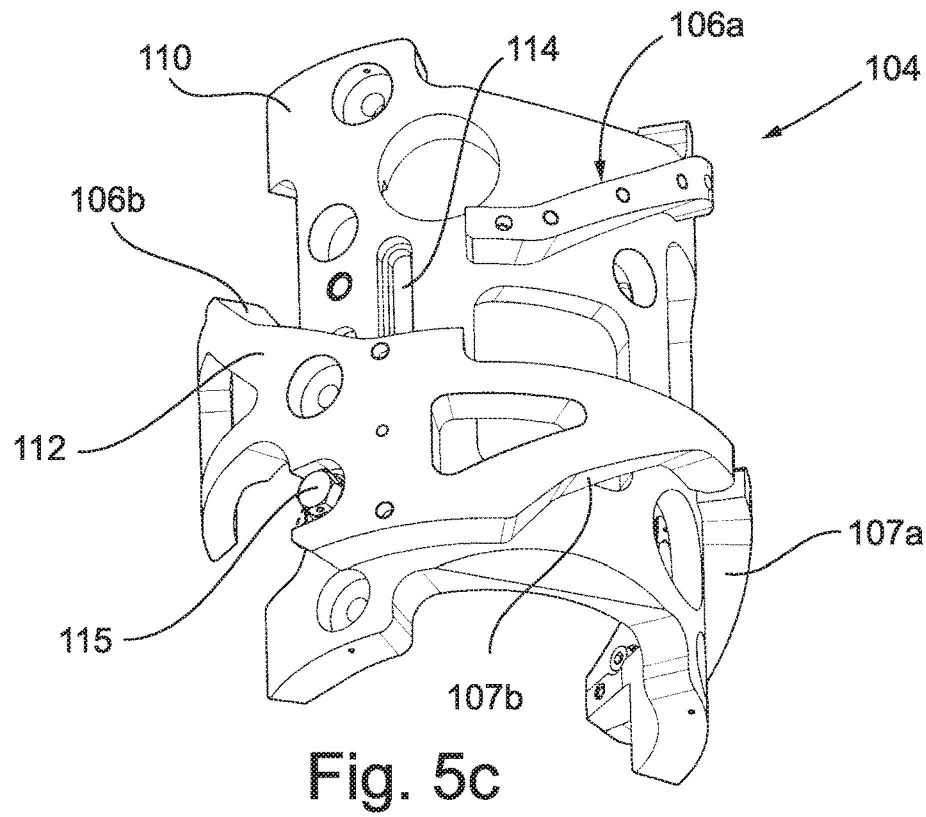
Figure 5D:
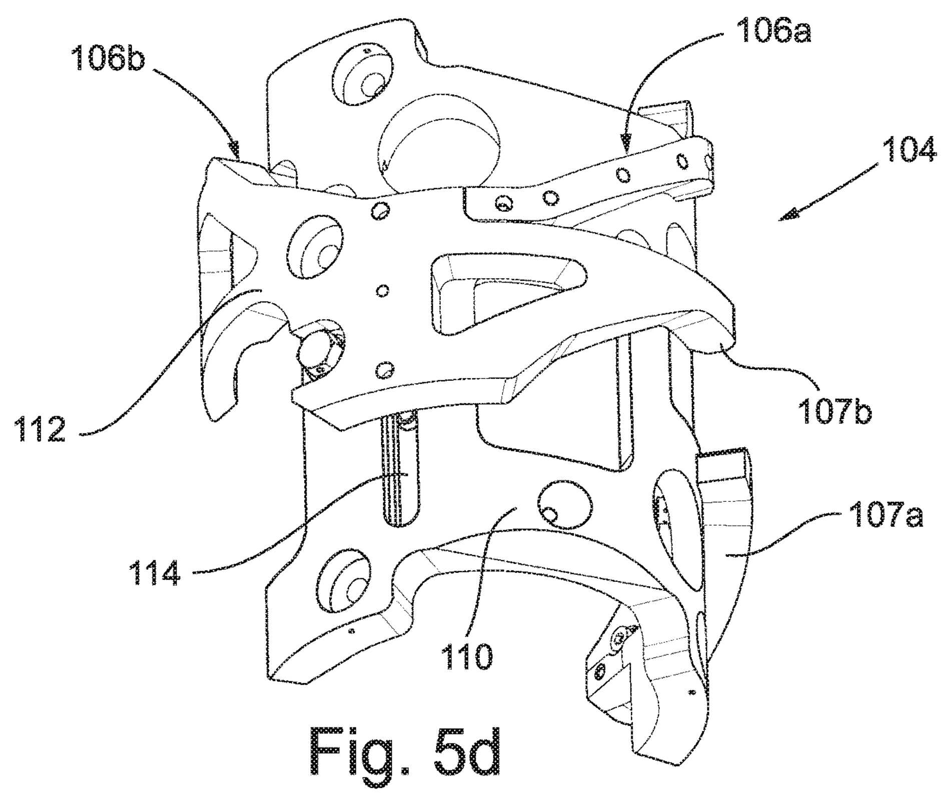

Body 104 is advantageously configured to be removed from support element 108 and be reassembled so as to be turned upside-down by 180° relative to said support element 108 (for example on a stationary upright—not numbered—on which said support element 108 is fitted is a mobile manner), so as to obtain a different field of aim with one single body 104. FIGS. 5*a* and 5*b* show body 104 configured to be fixed on support element 108 with a first orientation, whereas FIGS. 5*c* and 5*b* show body 104 oriented upside-down relative to FIGS. 5*a* and 5*b*. FIGS. 5*c* and 5*d* show body 104, in which mobile portion 112 assumes two different positions relative to fixed portion 110. In the convenient variant shown herein, fixed portion 110 comprises a further first profile 107*a* and mobile portion 112 comprises a further second profile 107*b*; said further first profile 107*a* and further second profile 107*b* forming the profile against which feeler pin 100 is going to strike. In FIG. 5*c*, the further first profile 107*a* and the further second profile 107*b* are aligned with one another and form a continuous profile, namely substantially without corners or gaps; on the other hand, in FIG. 5*d*, the further first profile 107*a* and the further second profile 10*b* are not aligned and, therefore, form a profile with corners. The first profiles 106*a* and 107*a* are profiles that externally protrude on fixed portion 110. Second profiles 106*b* and 107*b* are both comprised on mobile portion 112.

Advantageously, firearm support 28 comprises primary locking means to selectively lock the rotation of support element 108 relative to body 104 in any mutual angular position. Advantageously, coupling system 122 comprises secondary locking means to selectively lock the rotation of firearm 10 relative to support element 108 in any mutual angular position. For example, the primary and/or secondary locking means can be mechanical and can be activated by a user by means of known intervention means, such as a lever, a push-button, a turning handle, etc.

Preferably, firearm support 28 can be provided with adjustment means to limit the rotation of firearm 10 relative to support element 108, around the second axis x-x, to a preferred angular range. It is also possible to provide firearm support 28 with adjustment means to limit the rotation of support element 108 relative to the body, around the first axis z-z, to a preferred angular range.

Advantageously, support element 108 and/or body 104 can be made of carbon fiber or titanium.

Firearm support 28 is conveniently associated with an arm 26 and with a support system, as described and discussed above.

Naturally, the principle of the invention being set forth, embodiments and implementation details can be widely changed relative to what described above and shown in the drawings as a mere way of non-limiting example, without in this way going beyond the scope of protection provided by the accompanying claims.

The invention claimed is:

1. A firearm support system, the support system comprising:

an anchoring portion configured to be fixed to an upper structure above a bearing surface of a compartment of a vehicle and configured to be located in the compartment, wherein the anchoring portion is configured to be fixed to at least one rib or longerons of the upper structure of the compartment;

a mobile support coupled to the anchoring portion in a mobile manner, on which the firearm is assembled, and allows the firearm to move between an operating position, in which the firearm is ready to shoot through an opening of the compartment, and a non-operating position, in which the firearm is retracted;

wherein the mobile support comprises an arm, which is connected, at a first end, to the anchoring portion in a mobile manner, and is connected, at a second end, to a firearm support, which allows the firearm to rotate relative to the arm;

wherein the firearm support comprises:

a body, which is provided with a profile on a surface of the body;

a feeler pin, for striking against the profile and being coupled to the firearm so as to follow movement of said firearm;

a support element, rotatable around a traverse axis relative to the body, the support element being coupled to the firearm, allowing mutual rotation between said firearm and said support element around an elevation axis.

2. A firearm support system, the support system comprising:

an anchoring portion configured to be fixed to an upper structure above a bearing surface of a compartment of a vehicle and configured to be located in the compartment, a mobile support coupled to the anchoring portion in a mobile manner, on which the firearm is assembled, and allows the firearm to move between an operating position, in which the firearm is ready to shoot through an opening of the compartment, and a non-operating position, in which the firearm is retracted;

wherein the mobile support comprises an arm, which is connected, at a first end, to the anchoring portion in a mobile manner, and is connected, at a second end, to a firearm support, which allows the firearm to rotate relative to the arm, and wherein the mobile support is configured to slide on the anchoring portion;

wherein the firearm support comprises:

a body, which is provided with a profile on a surface of the body;

a feeler pin, for striking against the profile and being coupled to the firearm so as to follow movement of said firearm;

a support element, rotatable around a traverse axis relative to the body, the support element being coupled to the firearm, allowing mutual rotation between said firearm and said support element around an elevation axis.

3. The system according to claim 1, wherein the anchoring portion is an oblong element, fixed to a plurality of ribs or longerons belonging to the upper structure.

4. The system according to claim 1, wherein the mobile support is rotatable relative to the anchoring portion.

5. The system according to claim 1, wherein the arm is made of carbon fibre or titanium.

6. The system according to claim 1 and comprising an actuator to control movement of the mobile support relative to the anchoring portion.

7. The system according to claim 6, wherein the actuator controls movement of the arm relative to the anchoring portion.

8. The system according to claim 2, wherein the arm is slidable relative to the anchoring portion.

9. The system according to claim 4, wherein the arm is rotatable relative to the anchoring portion.

10. A firearm support system, the support system comprising:

an anchoring portion configured to be fixed to an upper structure above a bearing surface of a compartment of a vehicle and configured to be located in the compartment;

a mobile support coupled to the anchoring portion in a mobile manner, on which the firearm is assembled, and allows the firearm to move between an operating position, in which the firearm is ready to shoot through an opening of the compartment, and a non-operating position, in which the firearm is retracted, wherein the mobile support is rotatable relative to the anchoring portion;

wherein the mobile support comprises an arm, which is connected, at a first end, to the anchoring portion in a mobile manner, and is connected, at a second end, to a firearm support, which allows the firearm to rotate relative to the arm; and wherein the arm is rotatable relative to the anchoring portion;

wherein the firearm support comprises:

a body, which is provided with a profile on a surface of the body;

a feeler pin, for striking against the profile and being coupled to the firearm so as to follow movement of said firearm;

a support element, rotatable around a traverse axis relative to the body, the support element being coupled to the firearm, allowing mutual rotation between said firearm and said support element around an elevation axis;

an actuator to control movement of the arm relative to the anchoring portion, wherein the actuator includes a cord or rope or chain, which is connected to the arm to allow the actuator to rotate around a rotation axis.

11. The system according to claim 10, wherein the rope is operated by an operating mechanism configured to be manually operated by a user.

12. The system according to claim 11, wherein the operating mechanism includes a turning handle, for being held by a user, which, by turning, winds and respectively unwinds the rope to control rotation of the arm.

* * * * *